US006141113A

United States Patent [19]

Takahashi

[11] Patent Number: 6,141,113

[45] Date of Patent: Oct. 31, 2000

[54] INK DROPLET EJECTION DRIVE METHOD AND APPARATUS USING INK-NONEMISSION PULSE AFTER INK-EMISSION PULSE

[75] Inventor: Yoshikazu Takahashi, Nagoya, Japan

[73] Assignee: Brother Kogyo Kabushiki Kaisha, Nagoya, Japan

[21] Appl. No.: 09/007,756

[22] Filed: Jan. 15, 1998

[30] Foreign Application Priority Data

| | | | |
|---|---|---|---|
| Jan. 22, 1997 | [JP] | Japan | 9-009244 |
| Jan. 22, 1997 | [JP] | Japan | 9-009246 |

[51] Int. Cl.[7] .......... G06F 15/00

[52] U.S. Cl. .......... 358/1.8; 347/6; 347/9; 347/10; 347/11; 347/54; 347/57; 399/58; 399/67

[58] Field of Search .......... 395/108; 399/27, 399/50, 51, 53, 58, 66, 67; 346/140.1, 76; 347/6, 9, 10, 11, 54, 57, 12, 13; 358/1.8

[56] References Cited

U.S. PATENT DOCUMENTS

| | | | |
|---|---|---|---|
| 4,266,232 | 5/1981 | Juliana, Jr. et al. | 347/10 |
| 4,424,520 | 1/1984 | Matsuda et al. | 347/11 |
| 4,879,568 | 11/1989 | Bartky et al. . | |
| 4,887,100 | 12/1989 | Michaelis et al. . | |
| 4,972,211 | 11/1990 | Aoki . | |
| 4,992,808 | 2/1991 | Bartky et al. . | |
| 5,003,679 | 4/1991 | Bartky et al. . | |
| 5,028,936 | 7/1991 | Bartky et al. . | |
| 5,757,392 | 5/1998 | Zhang | 347/14 |
| 5,903,286 | 5/1999 | Takahashi | 347/11 |

FOREIGN PATENT DOCUMENTS

| | | |
|---|---|---|
| 62-299343 | 12/1987 | Japan . |
| 63-247051 | 10/1988 | Japan . |

*Primary Examiner*—Edward L. Coles
*Assistant Examiner*—Mark Wallerson

[57] ABSTRACT

In an ink droplet ejection drive method and apparatus, after plural ink emission pulses are generated for each one-dot print instruction or after plural ink emission pulses for plural one-dot print instructions, an ink nonemission pulse is generated to reduce residual pressure wave oscillation in an ink channel. The emission pulses and the nonemission pulse have the same voltage polarity and amplitude. The emission pulse has a time width corresponding to a one-way propagation time T of pressure wave in the ink channel, i.e., 8 μsec., while the nonemission pulse has a time width in a range of 0.3 T to 0.7 T or 1.3 T to 1.8 T. A period between the end time of the last emission pulse and the intermediate time corresponding to the midpoint between the start time and the end time of the nonemission pulse is determined to be in a range of 2.35 T to 2.65 T.

19 Claims, 8 Drawing Sheets

| Wc \ d2 | 2.3T | 2.35T | 2.4T | 2.5T | 2.6T | 2.65T | 2.7T |
|---|---|---|---|---|---|---|---|
| 0.2T | × | × | × | × | × | × | × |
| 0.3T | × | ○ | ○ | ○ | ○ | ○ | × |
| 0.4T | × | ○ | ◎ | ◎ | ◎ | ○ | × |
| 0.5T | × | ◎ | ◎ | ◎ | ◎ | ◎ | × |
| 0.6T | × | ○ | ◎ | ◎ | ◎ | ○ | × |
| 0.7T | × | ○ | ○ | ○ | ○ | ○ | × |
| 0.8T | × | × | × | × | × | × | × |
| 0.9T | × | × | × | × | × | × | × |
| 1.0T | × | × | × | × | × | × | × |
| 1.1T | × | × | × | × | × | × | × |
| 1.2T | × | × | × | × | × | × | × |
| 1.3T | × | ○ | ○ | ○ | ○ | ○ | × |
| 1.4T | × | ○ | ◎ | ◎ | ◎ | ○ | × |
| 1.5T | × | ◎ | ◎ | ◎ | ◎ | ◎ | × |
| 1.6T | × | ○ | ◎ | ◎ | ◎ | ○ | × |
| 1.7T | × | ○ | ○ | ○ | ○ | ○ | × |
| 1.8T | × | ○ | ○ | ○ | ○ | ○ | × |
| 1.9T | × | × | × | × | × | × | × |
| 2.0T | × | × | × | × | × | × | × |

T : 8 μsec
F : 15 kHz
◎: EJECTION RATE VARIATION BEING LESS THAN ±0.2 w/s
○: EJECTION RATE VARIATION BEING LESS THAN ±0.5 w/s
×: EJECTION RATE VARIATION BEING MORE THAN ±0.5 w/s

FIG. 9

| Wc \ d2 | 2.3T | 2.35T | 2.4T | 2.5T | 2.6T | 2.65T | 2.7T |
|---|---|---|---|---|---|---|---|
| 0.2T | × | × | × | × | × | × | × |
| 0.3T | × | ○ | ○ | ○ | ○ | ○ | × |
| 0.4T | × | ○ | ○ | ○ | ○ | ○ | × |
| 0.5T | × | ○ | ○ | ○ | ○ | ○ | × |
| 0.6T | × | ○ | ○ | ○ | ○ | ○ | × |
| 0.7T | × | ○ | ○ | ○ | ○ | ○ | × |
| 0.8T | × | × | × | × | × | × | × |
| 0.9T | × | × | × | × | × | × | × |
| 1.0T | × | × | × | × | × | × | × |
| 1.1T | × | × | × | × | × | × | × |
| 1.2T | × | × | × | × | × | × | × |
| 1.3T | × | ○ | ○ | ○ | ○ | ○ | × |
| 1.4T | × | ○ | ○ | ○ | ○ | ○ | × |
| 1.5T | × | ○ | ○ | ○ | ○ | ○ | × |
| 1.6T | × | ○ | ○ | ○ | ○ | ○ | × |
| 1.7T | × | ○ | ○ | ○ | ○ | ○ | × |
| 1.8T | × | ○ | ○ | ○ | ○ | ○ | × |
| 1.9T | × | × | × | × | × | × | × |
| 2.0T | × | × | × | × | × | × | × |

T: 8 μs
○: NO ACCIDENTAL DROP
×: ACCIDENTAL DROP

INK DROPLET EJECTION DRIVE METHOD AND APPARATUS USING INK-NONEMISSION PULSE AFTER INK-EMISSION PULSE

CROSS REFERENCE TO RELATED APPLICATION

This application relates to and incorporates herein by reference Japanese patent applications No. 9-9244 and No. 9-9246, both being filed on Jan. 22, 1997.

BACKGROUND OF THE INVENTION

1. Field of the Invention

The present invention relates to a method and apparatus for ink droplet ejection in printers and, more particularly, to a method and apparatus for ink droplet ejection which uses ink-nonemission pulse for each print instruction.

2. Description of Related Art

Among nonimpact-type printers which have been employed in place of impact-type printers recently, there are ink jet printers featuring simplicity in operating principle and easy applicability to multiple gradation and colorization. Particularly, drop-on-demand ink jet printers designed to eject ink droplets only at printing have rapidly become prevalent owing to high efficiency of ink ejection and low running cost.

In JP-A-63-247051, there is disclosed a drop-on-demand ink ejection apparatus of a shear mode type formed with piezoelectric material. As shown in FIGS. 12 and 13, an ink droplet ejection apparatus 600 of this type comprises a base wall 601, a top wall 602 and shear-mode actuator walls 603. Each actuator wall 603 comprises a lower wall 607 made of piezoelectric material, which is bonded to the base wall 601 and polarized in arrow direction 611, and an upper wall 605 made of piezoelectric material, which is bonded to the top wall 602 and polarized in arrow direction 609. Two actuator walls 603 are arranged in a pair to provide an ink channel 613 therebetween, and a space 615 narrower than the ink channel 613 is provided between adjacent pairs of actuator walls 603.

A nozzle plate 617 having a nozzle 618 is secured at one end of each ink channel 613, and an ink supply source (not shown) is connected at the other end thereof. Electrodes 619 and 621 are provided as metallized layers on both sides of each actuator wall 603. More specifically, the electrode 619 is provided on the actuator wall 603 forming the ink channel 613, and the electrode 621 is provided on the actuator wall 603 forming the space 615. The surface of the electrode 619 is coated with an insulating layer 630 for insulation against ink. The electrode 621 having the space 615 therein is connected with the ground 623, and the electrode 619 having the ink channel 613 therein is connected with a control device 625 which applies actuator drive signals.

In operation, the control device 625 applies a drive signal to each ink channel 613 to cause piezoelectric thickness slide deformation of each actuator wall 603 so that a volume of the ink channel 613 is increased. For instance, as shown in FIG. 14, when the drive signal having a voltage amplitude E (V) is applied to an electrode 619*c* of one ink channel 613*c*, electric fields are produced in actuator walls 603*e* and 603*f* in arrow directions 631 and 632 respectively, causing piezoelectric thickness slide deformation of the actuator walls 603*e* and 603*f* to occur to increase a volume of the ink channel 613*c*. In this operation, pressure in the ink channel 613*c* including a vicinal part of a nozzle 618*c* is decreased.

Application of the voltage E (V) is maintained during a period of one-way propagation time T of the pressure wave in the ink channel 613*c*, thereby causing an ink supply source (not shown) to feed ink thereinto.

The one-way propagation time T indicates a period of time required for a pressure wave in the ink channel 613*c* to complete propagation in the longitudinal direction of the ink channel 613*c*. Using length 'L' of the ink channel 613*c* and acoustic velocity 'a' in ink in the ink channel 613*c*, 'T' is expressed as T=L/a.

On the principle of pressure wave propagation, after a lapse of time T following application of the voltage, pressure in the ink channel 613*c* is reversed to become positive pressure. At timing of pressure reversal, voltage being applied to an electrode 621*c* of the ink channel 613*c* is reset to zero (0) V. Thus, the actuator walls 603*e* and 603*f* are restored to normal (as shown in FIGS. 12 and 13), applying pressure to ink. At this time, the positive pressure is added to pressure which has been produced by restoration of the actuator walls 603*e* and 603*f* to normal so that relatively high pressure is generated in the vicinity of the nozzle 618*c* in the ink channel 613*c*, thereby ejecting a droplet of ink through the nozzle 618*c*.

In this conventional ink droplet ejection apparatus 600, since a volume of ink per droplet to be ejected is determined depending on such factors as configuration of the ink channel 613, drive signal voltage amplitude (E), etc., it is required to alter the configuration of the ink channel if the amount of ink per droplet must be increased to provide better quality of printing. Still more, even if the necessary amount of ink per droplet is attained, it is required to lower the drive frequency of the drive signal for coping with degradation of stability in ink droplet ejection.

It is also known, as shown in FIG. 15 to generate two ink-emission pulses A and B successively in each drive signal in response to a one-dot print instruction so that two successive ink droplets on the fly are combined into a single droplet having a relatively large volume before an ink droplet formed by the preceding emission pulse A separates completely from ink in the ink channel. However, in such an arrangement, pressure in the vicinity of the nozzle 618 becomes extremely high due to the second emission pulse B, making it difficult to attenuate pressure readily. As in the foregoing case, even if the necessary amount of ink per droplet is attained, the drive frequency of the drive signal must be decreased to cope with degradation of stability in ink droplet ejection.

Further, if viscosity of ink decreases due to an increase in temperature or any other cause, residual pressure wave oscillation may cause an undesired accidental droplet of ink to be ejected after ejection of a single droplet or plural droplets, making it difficult to attain satisfactory quality of printing.

In another known arrangement, disclosed in JP-A-62-299343 for example, an ink-emission pulse for ink droplet ejection is followed by a cancel pulse to reduce residual pressure wave oscillation in an ink channel. More specifically, a pressure wave for ink droplet ejection rebounds from the front and rear ends of the ink channel, and a nozzle meniscus is vibrated after a lapse of time 4 T following the start of ink droplet ejection. To obviate this phenomenon, a pressure wave for phase reversal is produced. However, in such an arrangement that a cancel pulse is generated after a lapse of time 4 T following the start of ink droplet ejection, it is impossible to use a plurality of successive emission pulses. Furthermore, in addition to a positive power supply for generating ink-emission pulses, a negative power supply for generating reverse-phased cancel pulses is required causing disadvantages of complexity in the control device circuit and an increase in production cost.

SUMMARY OF THE INVENTION

It is therefore an object of the present invention to overcome the disadvantages caused in the conventional arrangement and to provide an ink droplet ejection drive method and apparatus which enables use of a single polarity power source.

It is another object of the present invention to provide an ink droplet ejection drive method and apparatus which enables ejection of the necessary amount of ink per droplet for printing operation and ensures stable, satisfactory printing quality in operation at a high drive frequency.

It is a further object of the present invention to provide an ink droplet ejection drive method and apparatus which ensures satisfactory printing quality without an undesired accidental droplet of ink even if viscosity of ink decreases at elevated temperature.

According to the present invention, in an ink droplet ejection apparatus having an actuator which deforms an ink channel, an ink emission pulse having a time width corresponding to an odd-numbered multiple of one-way propagation time T of a pressure wave in the ink channel is applied to the actuator for ejection of ink from the ink channel, and then an ink nonemission pulse having the same voltage polarity and magnitude as that of the emission pulse is applied to the actuator for nonejection of ink from the ink channel after a predetermined period from the last one of the ink emission pulse so that the nonemission pulse suppresses residual pressure wave oscillation in the ink channel.

In one form of the invention, the emission pulse is applied to the actuator plural times followed by the nonemission pulse in response to each one-dot print instruction. In another form of the invention, the emission pulse is applied to the actuator in a cycle period of each one-dot print instruction and the nonemission pulse is applied only when the emission pulse is absent in the next cycle period from the last print instruction.

Preferably, in each form of the invention, the nonemission pulse has a time width in a range of one of 0.3 T to 0.7 T and 1.3 T to 1.8 T, and the predetermined period is in a range of 2.35 T to 2.65 T when defined as a period starting from an end of the last emission pulse and ending at a midpoint between a start and end of the nonemission pulse.

BRIEF DESCRIPTION OF THE DRAWINGS

Other objects, features and advantages of the present invention will become more apparent from the following detailed description when read with reference to the accompanying drawings. In the drawings:

FIG. 9 is a table showing the results of experiment conducted for determining an optimum range of pulse width in the drive signal used in the second embodiment;

FIG. 12 is a vertical cross-sectional view of an ink droplet ejection apparatus according to a conventional arrangement and the embodiments of the present invention;

DETAILED DESCRIPTION OF THE PREFERRED EMBODIMENTS

The present invention will now be described in detail with reference to the presently preferred exemplary embodiments. It is to be noted that those preferred embodiments also uses an ink droplet ejection apparatus which is the same as that shown in FIGS. 12 and 13.

(First Embodiment)

In the first embodiment, an ink droplet ejection apparatus 600 (FIGS. 12 and 13) is constructed as follows. An ink channel 613 has a length 'L' of 7.5 mm, and a nozzle 618 has a diameter of 40 μm on the side of ink droplet ejection, a diameter of 72 μm on the side of ink channel 613 and a length of 100 μm. The viscosity of ink is approximately 2 mPa·s at 25° C. and surface tension thereof is 30 mN/m. The ratio (L/a=T) between the acoustic velocity 'a' in ink in the ink channel 613 and the length 'L' is 8 μsec.

Figure 1:
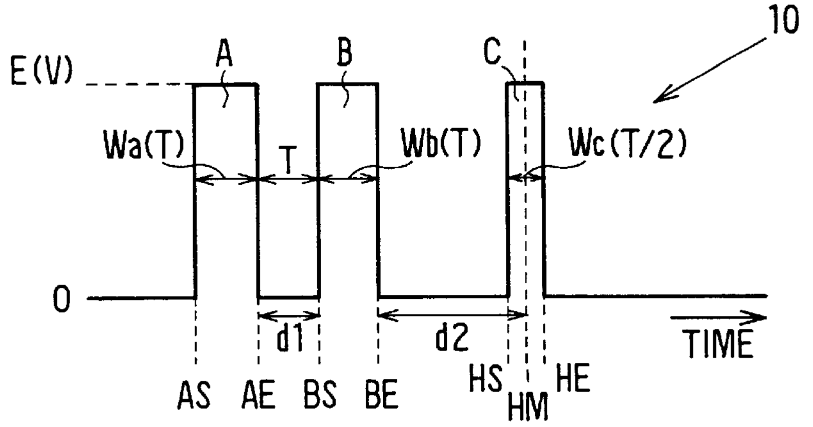
FIG. 1 is a time chart showing a waveform of a drive signal used in an ink droplet ejection drive according to a first embodiment of the present invention.

As shown in FIG. 1, a drive signal 10 to be applied to the electrode 619 of the ink channel 613 includes two ink-emission pulses A and B for ink droplet ejection, and one ink-nonemission pulse C for reducing residual pressure wave oscillation in the ink channel 613. Each of the emission pulse A and B and the nonemission pulse C has an amplitude (voltage value) of E (V) (e.g., 20 (V)). Each of time widths Wa and Wb of the emission pulses A and B correspond to a one-way propagation time T(=L/a) of pressure wave in the ink channel 613, i.e., 8 μsec. A period d1 between a fall (end) time AE of the emission pulse A and a rise (start) time BS of the emission pulse B also corresponds to the one-way propagation time T(=L/a) of pressure wave in the ink channel 613, i.e., 8 μsec. A time width Wc of the nonemission pulse C is 0.5 times the one-way propagation time of pressure wave in the ink channel 613, i.e., 4 μsec. Having this time width, the nonemission pulse C does not cause a droplet of ink to be ejected. A period d2 between the fall time BE of the emission pulse B and an intermediate time HM of the nonemission pulse C, which corresponds to a midpoint between the rise time HS and the fall time HE of the nonemission pulse C, is 2.5 times the one-way propagation time T of pressure wave in the ink channel 613, i.e., 20 μsec.

Figure 2:
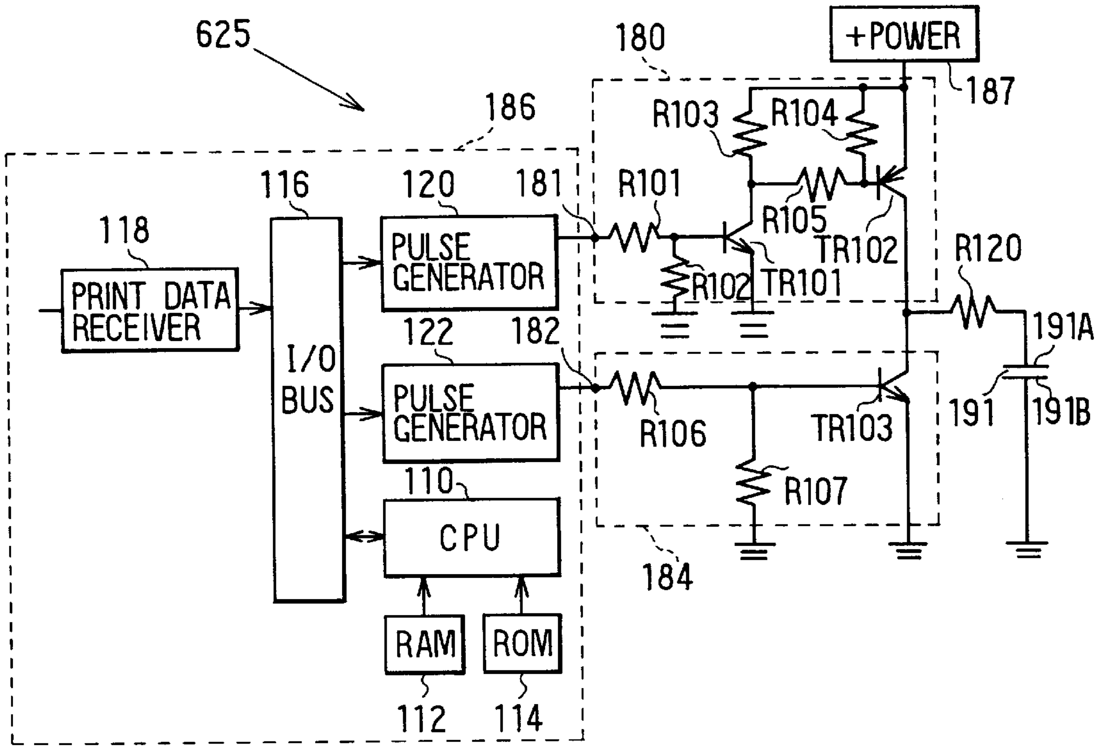
FIG. 2 is an electric wiring diagram showing a drive circuit used for the ink droplet ejection drive.

In connection with implementation of the drive signal 10, the control device 625 (FIG. 13) is constructed as shown in FIG. 2. The control device 625 comprises a charge circuit 180, a discharge circuit 184 and a pulse control circuit 186. Piezoelectric material of the actuator wall 603 and electrodes 619 and 621 are represented by a capacitor 191, which has terminals 191A and 191B.

Input terminals 181 and 182 are provided for inputting pulse by which voltage applied to the electrode 619 of the ink channel 613 is set to one of levels E (V) and 0 (V), respectively. The charge circuit 180 comprises resistors R101, R102, R103, R104, R105, transistors TR101 and TR102.

Figure 3:
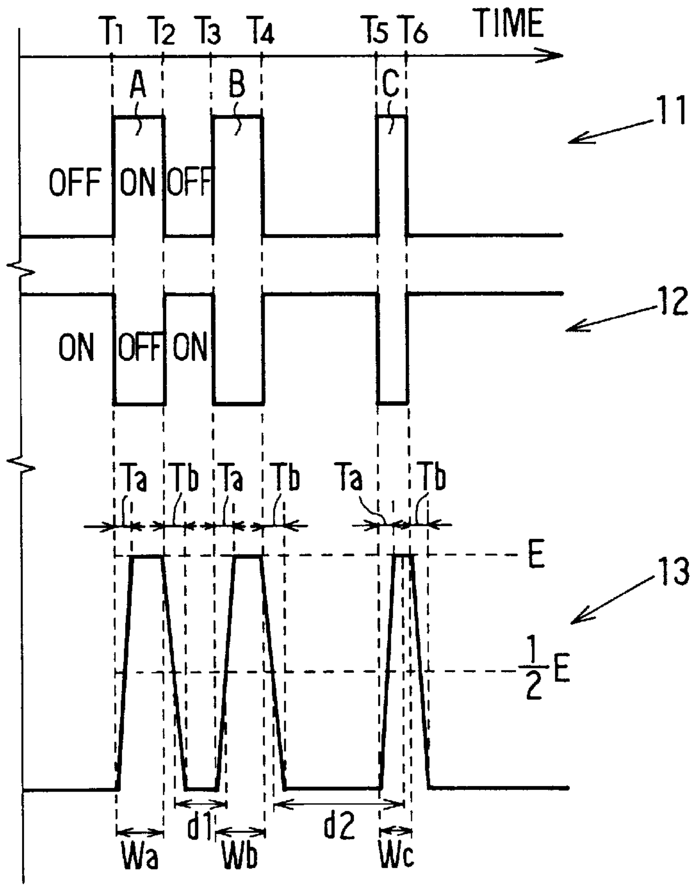
FIG. 3 is a timing chart showing a drive sequence in the ink droplet ejection drive according to the first embodiment.

When an ON signal (+5 V) 11 shown in FIG. 3 is applied to the input terminal 181, the transistor TR101 becomes conductive through the resistor R101, causing current to flow from a positive power supply 187 through the resistor R103 in the collector-to-emitter direction of the transistor TR101. Therefore, voltage applied across the resistors R104 and R105 connected with the positive power supply 187 increases to increase current fed to the base of the transistor TR102, thereby turning the transistor TR102 conductive. Voltage of 20 (V) from the positive power supply 187 is then applied to the terminal 191A of the capacitor 191 through the collector and emitter of the transistor TR102 and a resistor 120.

Figure 12:
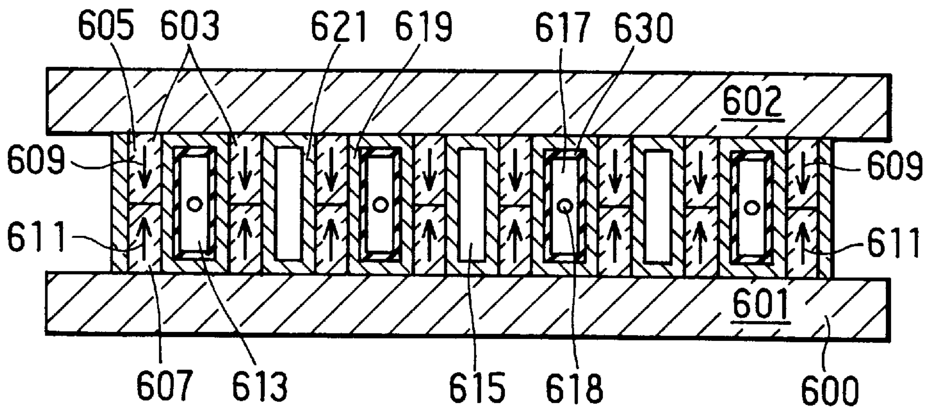
FIG. 12 PRIOR ART
FIG. 12 is a cross-sectional view of an ink droplet ejection apparatus according to a conventional arrangement and the embodiments of the present invention.
Figure 13:
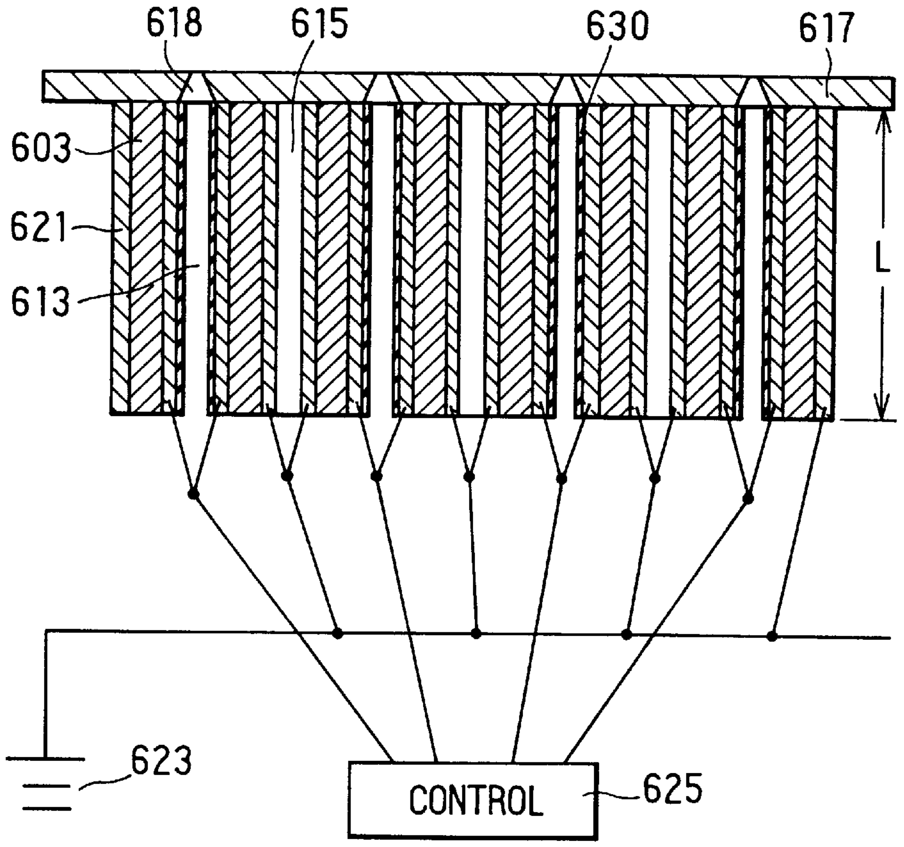
FIG. 13 PRIOR ART
FIG. 13 is a horizontal cross-sectional view of the ink droplet ejection apparatus shown in FIG. 12.

The discharge circuit 184 comprises resistors R106, R107 and a transistor TR103. When an ON signal (+5 V) 12 shown in FIG. 3 is applied to the input terminal 182, the transistor TR103 becomes conductive through the resistor R106, causing the terminal 191A of the capacitor 191 to be grounded through the resistor R120. Therefore, voltage applied to the actuator wall 603 of the ink channel 613 shown in FIGS. 12 and 13 is discharged.

The signal 11 of the drive signal 10 to be applied to the input terminal 181 of the charge circuit 180 is normally in an off state as shown in FIG. 3. For ink droplet ejection, the signal 11 is turned on at timing T1 and off at timing T2. Then, this signal is turned on at timing T3 and off at timing T4, and further it is turned on at timing T5 and off at timing T6.

Also, as shown in FIG. 3, the signal 12 to be applied to the input terminal 182 of the discharge circuit 184 is turned off when the input signal 11 turns on at timings T1, T3 and T5 and it is turned on when the input signal 11 turns off at timings T2, T4 and T6.

An output signal 13 applied to the electrode 191A of the capacitor 191 is normally kept at 0 (V), and it increases to a voltage amplitude of E (V) (e.g., 20 (V)) when the capacitor 191 (actuator wall 603) is charged in response to the signal 11 at timings T1, T3 and T5 and a charge period Ta elapses which is determined by the transistor TR102, the resistor R120 and the actuator wall 603 formed as a shear-mode piezoelectric element. In response to the signal 12 at the timing T2, T4 and T6, the output signal 13 decreases from E (V) to 0 (V) after a lapse of a discharge period Tb which is determined by the actuator wall 603, resistor R120 and transistor TR103.

The actual drive signal 13 has delay periods Ta and Tb at the leading and trailing edges, respectively. Therefore, each of the timings T3, T4, T5 and T6 is set so that the period d2 between the fall time BE of the emission pulse B and the intermediate time HM of the nonemission pulse C (which corresponds to a midpoint between the rise time HS and the fall time HE of the nonemission pulse C) is as shown in FIG. 1 at a voltage level of ½ E (V) (e.g., 10 (V)).

The pulse control circuit 186 is constructed to generate signals 11 and 12 at the timings T1 to T6 to be fed to the input terminal 181 of the charge circuit 180 and the input terminal 182 of the discharge circuit 184.

Figure 4:
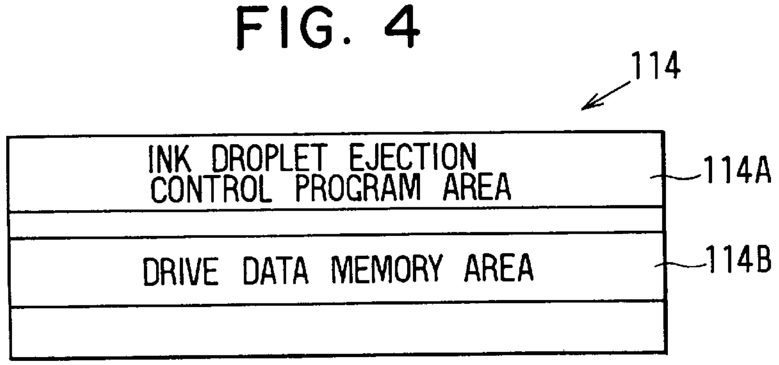
FIG. 4 is a schematic view showing ROM memory areas of a control device used in the ink droplet ejection drive.

The pulse control circuit 186 is provided with a CPU 110 which carries out various arithmetic and logic operations. The CPU 110 is connected with a RAM 112, which stores print data and other various data, and a ROM 114, which stores control program for the pulse control circuit 186 and sequence data for determining the ON and OFF signals with the timings T1 to T6. As shown in FIG. 4, the ROM 114 comprises an ink droplet ejection control program memory area 114A and a drive signal data memory area 114B. In this arrangement, sequence data of the drive signal 10 is stored in the drive signal data memory area 114B.

The CPU 110 is also connected with an I/O bus 116 for transferring various data to be exchanged, and the I/O bus 116 is connected with a print data receiver circuit 118 and pulse generators 120 and 122. Output of the pulse generator 120 is connected with the input terminal 181 of the charge circuit 180, while output of the pulse generator 122 is connected with the input terminal 182 of the discharge circuit 184.

According to the sequence data stored in the drive signal data memory area 114B of the ROM 114, the CPU 110 controls the pulse generators 120 and 122. Therefore, by pre-storing various patterns of the timings T1 to T6 in the drive signal data memory area 114B of the ROM 114, the drive pulses of the drive signal 10 shown in FIG. 1 can be applied to the actuator wall 603.

The pulse generators 120 and 122, the charge circuit 180, and the discharge circuit 184 are provided for each of nozzles of an ink jet printer head. The same circuit arrangement should be made for each of the remaining nozzles.

In one ink droplet ejection experiment conducted using the drive method of the first embodiment, with driving at 20 (V), two droplets of ink were -ejected in response to the emission pulses A and B followed by the nonemission pulse C at an ejection rate of 5.5 m/s. As a result, the measured sum volume of two ink droplets was 55 pl (pico liters). For the purpose of comparison, the driving was also performed only with the emission pulse B and the nonemission pulse C without using the emission pulse A in the drive signal 10. In this case, a single droplet of ink was ejected at an ejection rate of 5 m/s. As a result, the measured volume of the ink droplet was 30 pl. As can be understood from this comparison, the volume of ink to be ejected can be increased by doubling the number of emission pulses for a one-dot print instruction.

Figures 5, 6:
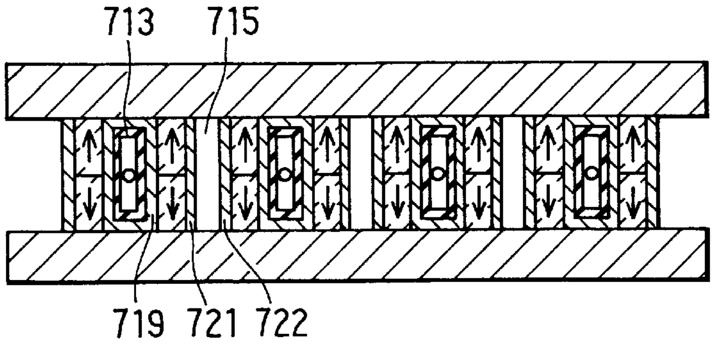
FIG. 5 is a table showing the results of experiment conducted for determining an optimum range of pulse width in the first embodiment.
FIG. 6 is a cross-sectional view of an ink droplet ejection apparatus used in a modification of the first embodiment.
Figure 7:
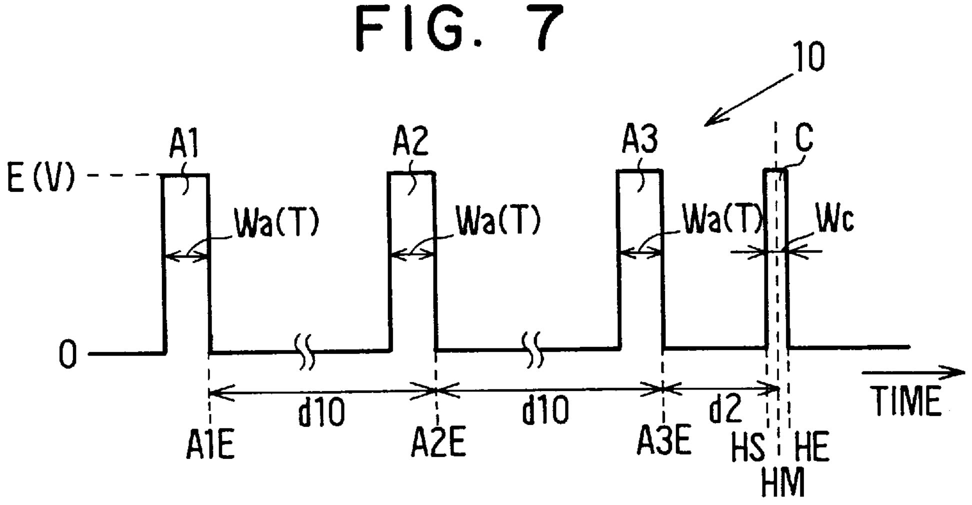
FIG. 7 is a time chart showing a waveform of a drive signal used in an ink droplet ejection drive according to a second embodiment of the present invention.

In another experiment conducted to determine an optimum range of the time width Wc of the nonemission pulse C and an optimum range of the period d2 between the fall time BE of the emission pulse B and the intermediate time HM of the nonemission pulse C, the following results were provided as shown in FIG. 5. In this experiment, the width Wc of the nonemission pulse C was changed in a range of 0.2 T to 2.0 T and the period d2 between the fall time BE of the emission pulse B and the intermediate time HM of the nonemission pulse C was changed in a range of 2.3 T to 2.7 T. In this evaluation, variations in ink droplet ejection rate were measured in continuous driving operation with voltage E of 20 (V) at a drive frequency (F) of 15 kHz. Such an irregularity as unstable ejection, undesired spraying or stop of ejection is indicated by cross marks (X) in the table of FIG. 5.

According to the results of the above evaluation, it is apparent that variations in ink droplet ejection rate are stable within a range of +0.5 m/s even at a drive frequency as high as 15 kHz under condition that the width Wc of the non-emission pulse C is in a range of 0.3 T to 0.7 T or 1.3 T to 1.8 T and the period d2 between the fall time BE of the emission pulse B and the intermediate time HM of the nonemission pulse C is in a range of to 2.65 T. Therefore, under the above condition indicated by circles (○) or double circles (◎) in FIG. 5, ink droplets can be ejected to provide good quality of printing.

It is to be understood in the first embodiment that the period d1 between the fall time AE of the emission pulse A and the rise time BS of the emission pulse B is equal to the one-way propagation time T of pressure wave in the ink channel. However, the period dl may be an odd-numbered multiple of T, e.g., 3 T.

Still more, although two emission pulses A and B are generated in response to each one-dot print instruction in the embodiment, three or more emission pulses may be issued for a one-dot print instruction. It is confirmed that stable ejection can be attained even in case of three or more emission pulses at a high drive frequency under condition that the period d2 between the fall time of the last one of the emission pulse and the intermediate time HM of the non-emission pulse C is in a range of 2.35 T to 2.65 T and the time width Wc of the nonemission pulse C is in a range of 0.3 T to 0.7 T or 1.3 T to 1.8 T. As the number of emission pulse to be generated for a one-dot print instruction is increased, the volume of ink per droplet is increased. According to a required level of printing density, the necessary amount of ink per droplet can be ejected by changing the number of emission pulse. In this case, it is to be understood that various changes are possible in each pulse width and interval of plural emission pulses for a one-dot print instruction. For instance, the pulse width of each emission pulse may be made different in such a fashion that the width of the first emission pulse is 0.5 T and the width of the second and subsequent emission pulse is 1 T or 3 T. It is also possible to make such an arrangement that plural emission pulses are generated to produce plural ink droplets successively and two successive ink droplets on the fly are combined into a single droplet having a relatively large volume before an ink droplet formed by the preceding emission pulse separates completely from ink in the ink channel.

Furthermore, although the positive power supply 187 is used in the first embodiment, a negative power supply may be employed instead so that the polarizing directions 609 and 611 shown in FIG. 12 are reversed.

Also, as shown in FIG. 6, it is possible to make such an arrangement that the polarizing directions are reversed from that of the first embodiment (FIG. 12). That is, an electrode 719 of each ink channel 713 is connected with ground, and each electrode of the space 715 is divided into two electrodes 721 and 722. The one electrode 721 is connected with the resistor R120 shown in FIG. 2, and the other electrode 722 is connected with a similar resistor (not shown) of the charge circuit for ink droplet ejection.

Although the volume of the ink channel 613 is changed by deforming both the lower wall 607 and upper wall 605 of the actuator wall 603 in the first embodiment, it is also possible to provide such an arrangement that either one of the lower and upper walls is made of material of non-piezoelectric deformation type and the other wall made of piezoelectric material is deformed for ink droplet ejection.

Moreover, although the space 615 is provided on both sides of the ink channel 613 in the first embodiment, respective ink channels may be arranged adjacently without space. Also, instead of the shear-mode actuator used in the first embodiment, a laminar piezoelectric material may be employed so that a pressure wave is generated by deformation in the laminar direction thereof.

According to the above first embodiment and its modifications in which a plurality of emission pulses are applied for a one-dot print instruction to eject plural droplets of ink, it becomes possible to increase the volume of ink per droplet in comparison with the case of using a single emission pulse. In this arrangement, it is possible to provide the necessary amount of ink per droplet for printing at low cost without having to alter the ink channel configuration in the ink droplet ejection apparatus.

Also, since the nonemission pulse having a specified range of time width is applied in a specified range of timing after generation of plural emission pulses, residual pressure wave oscillation in the ink channel after ink droplet ejection can be suppressed to ensure stable droplet ejection in printing operation at a high drive frequency.

Further, since the amplitude and the polarity of the emission pulses is equal to that of the nonemission pulse, the drive power supply may comprise a single power supply source.

Still more, the actuator is comprised of at least one wall part included in the ink channel and at least one area of the wall part is formed with piezoelectric material so that ink droplets can be ejected without applying heat to ink as in thermal jet arrangements, thereby making it possible to ensure stable ink droplet ejection in printing operation at a high drive frequency.

(Second Embodiment)

Figure 10:
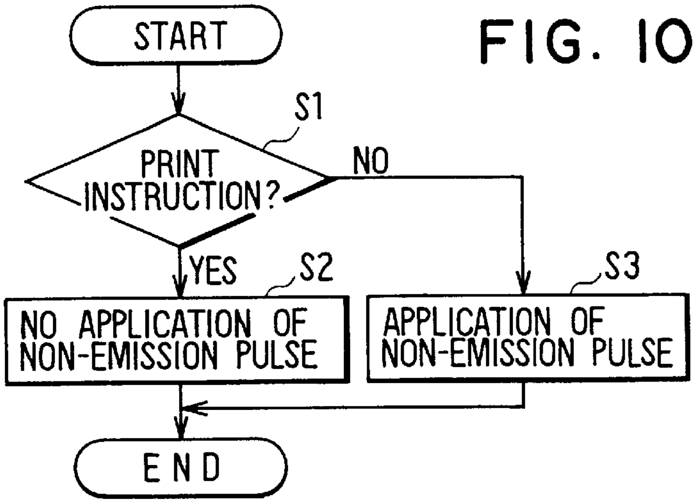
FIG. 10 is a flowchart showing execution steps of an ink droplet ejection drive control used in the second embodiment.

In the second embodiment, the same ink jet ejection apparatus (FIGS. 12 and 13) is used while the control device 625 is constructed to apply to the electrode 619 of the ink channel 613 a drive signal 10 shown in FIG. 10 for printing three dots in succession.

The drive signal 10 has three ink-emission pulses A1, A2 and A3 for ink droplet ejection and an ink nonemission pulse C for reducing residual pressure wave oscillation in the ink channel 613. Each of the emission pulses A1, A2, A3 and the nonemission pulse C has the same voltage amplitude of E (V) (e.g., 20 (V)). Each time width Wa of the emission pulse A1, A2 and A3 corresponds to a ratio 'L/a'=T (i.e., 8 μsec) between the acoustic velocity 'a' in ink in the ink channel 613 and the length 'L' thereof. The three emission pulses A1, A2 and A3 are applied in succession respectively at intervals of period d10 (A1E to A2E, or A2E to A3E) corresponding to a predetermined cycle time (100 psec. at frequency of 10 kHz, for instance). Then, if no print instruction is issued in one cycle time (100 μsec) following the third emission pulse A3, the nonemission pulse C is applied.

The time width Wc of the nonemission pulse C is 0.5 times the one-way propagation time T of pressure wave in the ink channel 613, i.e., 4 μsec. Having this time width, the nonemission pulse B does not cause a droplet of ink to be ejected.

The period d2 between the fall time A3E of the third emission pulse A3 and the intermediate time HM which corresponds to the midpoint between the rise time HS and the fall time HE of the nonemission pulse C, is 2.5 times the one-way propagation time T of pressure wave in the ink channel 613, i.e., 20 μsec.

Figure 8:
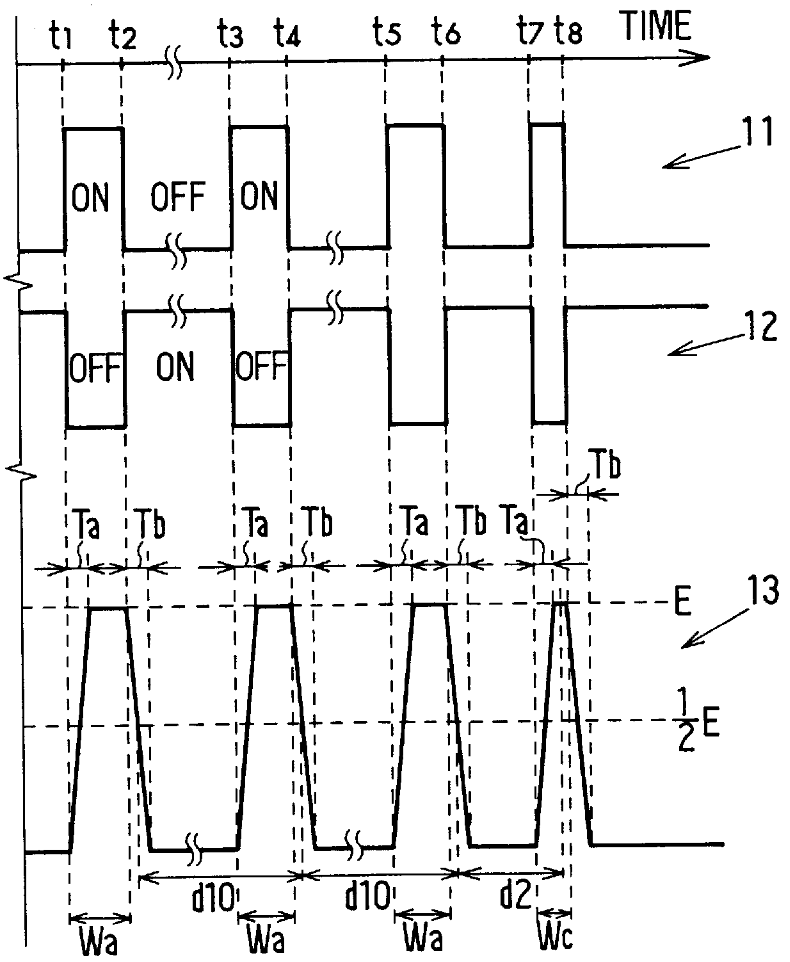
FIG. 8 is a timing chart showing a drive sequence in the ink droplet ejection drive according to the second embodiment.

Input signals 11 and 12 to the input terminals 181 and 182 and an output signal to the capacitor 191 are shown in FIG. 8.

The input signal 11 to be applied to the input terminal 181 of the charge circuit 180 is normally in an off state. For ink droplet ejection, the input signal 11 is turned on at timing t1 and off at timing t2. Then, this signal is turned on at timing t3 and off at timing t4, on at timing t5 and off at timing t6, and further it is turned on at timing t7 and off at timing t8. Also, the input signal 12 to be applied to the input terminal 182 of the discharge circuit 184 is turned off when the input signal 11 turns on at timings t1, t3, t5, t7 and it is turned on when the input signal 11 turns off at timings t2, t4, t6, t8.

The actual drive signal 13 has delay periods Ta and Tb at the leading and trailing edges, respectively. Therefore, each of the timings t6, t7 and t8 are set so that the period d2 between the fall time A3E of the third emission pulse A3 and the intermediate time HM of the nonemission pulse B which corresponds to the midpoint between the rise time HS and the fall time HE of the nonemission pulse B is as shown in FIG. 8 at a voltage level of ½ E (V) (e.g., 10 (V)).

The ink droplet ejection control program memory area 114A (FIG. 4) holds a program shown in FIG. 10 for the CPU 110 to determine whether a one-dot print instruction is given at a cycle time subsequent to the emission pulse (step S1) and accordingly to determine whether the nonemission pulse C is to be applied for the emission pulse data memorized in the drive signal data memory area 114B (steps S2 and S3).

In the ink droplet ejection experiment conducted using the drive method of the second embodiment, three droplets of ink were ejected in response to the emission pulses A1, A2 and A3 respectively under conditions of an ambient temperature of 25° C. and a drive frequency of 10 kHz with driving voltage E at 20 (V). When the ejection rate was 5.0 m/s, the volume of each ink droplet was 35 pl. With the driving voltage E at 17 (V) at an elevated temperature of 40° C. incurring a decrease in ink viscosity (the viscosity of ink employed in this experiment decreased to approximately 1 mPa·s), three droplets of ink were also ejected in response to the emission pulses A1, A2 and A3 respectively. When the ejection rate was 5.0 m/s, the volume of each ink droplet was 42 pl. In both cases, without an undesired accidental droplet of ink, stable ejection was carried out in subsequent operation.

For the purpose of comparison, the driving was performed only with the emission pulses A1, A2 and A3 without the nonemission pulse in the drive signal 10 under conditions of an ambient temperature of 25° C. and a drive frequency of 10 kHz with 20 (V). In this case, three droplets of ink were ejected in response to the emission pulses A1, A2 and A3 respectively. When the ejection rate was 5.0 m/s, the volume of each ink droplet was 35 pl as in the above first case that the nonemission pulse C was used. In case of driving with 17 (V) at an ambient temperature of 40° C. incurring a decrease in ink viscosity (the viscosity of ink employed in the experiment decreased to approximately 1 mPa·s), three droplets of in were ejected in response to the emission pulses A1, A2 and A3 respectively. When the ejection rate was 5.0 m/s, the volume of each ink droplet was 42 pl. However, because of absence of the nonemission pulse, an undesired accidental droplet of ink occurred in subsequent operation, resulting in unsatisfactory quality of printing. As can be seen from the results of the above experiment, the drive method of the second embodiment can provide good quality of printing without an undesired accidental droplet even when the viscosity of ink decreases at an elevated temperature.

Further another experiment was conducted to determine an optimum range of width Wc of the nonemission pulse C and an optimum range of period d2 between the fall time A3E of the third emission pulse A3 and the intermediate timing HM of the nonemission pulse B.

In this experiment, as shown in FIG. 9, the time width Wc of the nonemission pulse C was changed in a range of 0.2 T to 2.0 T and the period d2 between the fall time A3E of the third emission pulse A3 and the intermediate time HM of the nonemission pulse C was changed in a range of 2.3 T to 2.7 T. In this evaluation, ink droplets were ejected under conditions of an elevated temperature of 40° C. and a drive frequency of 10 kHz with driving at 20 (V). As a result, an undesired accidental droplet occurred in ink droplet ejection in some ranges as shown by cross marks (X) in FIG. 9.

As understood from FIG. 9, it is apparent that an undesired accidental droplet does not occur under condition that the time width Wc of the nonemission pulse C is in a range of 0.3 T to 0.7 T or 1.3 T to 1.8 T and the period d2 is in a range of 2.35 T to 2.65 T. Therefore, within those ranges, ink droplet ejection can be performed to provide good quality of printing.

In the second embodiment, successive three dots of ink are printed. In case that no print instruction is given at a subsequent cycle time in printing operation of a single dot or plural dots in succession, similar results to the foregoing may be attained by making an arrangement that the width Wc of the nonemission pulse C is in a range of 0.3 T to 0.7 T or 1.3 T to 1.8 T and the period d2 is in a range of 2.35 T to 2.65 T.

Figure 11:
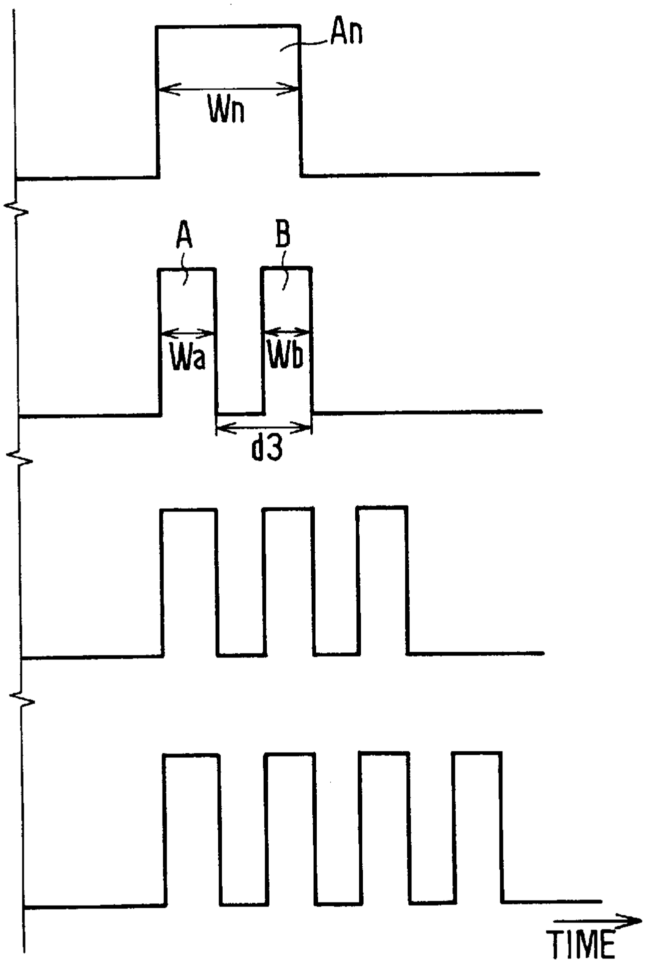
FIG. 11 is a time chart showing drive signals used in the modifications of the second embodiment.

It is to be understood various changes are possible in the number of emission pulses, pulse width, pulse interval, and drive frequency. As shown in FIG. 11, each emission pulse An may have a width Wn (e.g., 3 T or 5 T) which is an odd-numbered multiple 'n' of the ratio (T=L/a) between the acoustic velocity 'a' in ink in the ink channel 613 and the length 'L' thereof. Also, two emission pulses A and B may be used for a one-dot print instruction as in the first embodiment. In use of these emission pulses A and B, it is possible to make such an arrangement that each time widths Wa is equal to T or an odd-numbered multiple of T, a pulse interval d3 is equal to T or an odd-numbered multiple of T, or either one of widths Wa the emission pulses A and B is equal to 0.5 T or an odd-numbered multiple of T. In any of these cases, it is realizable to attain similar results. Further, for a one-dot print instruction, three or more emission pulses may be used to attain similar results.

Still more, although the drive frequency representing a drive cycle time is 10 kHz in the second embodiment, a lower drive frequency such as 2 kHz or a higher drive frequency may be used to provide similar results since an oscillation cycle of ink meniscus at the nozzle opening 618 lags behind a cycle of pressure wave propagation.

Figure 14:
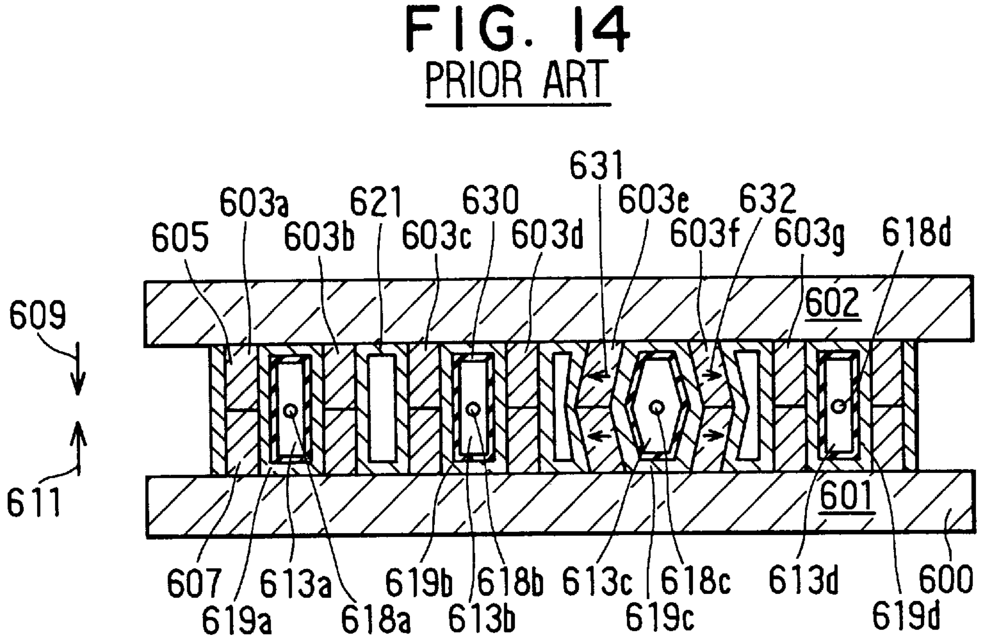
FIG. 14 PRIOR ART
FIG. 14 is a vertical cross-sectional view showing one operational mode of the ink droplet ejection apparatus shown in FIG. 12.
Figure 15:
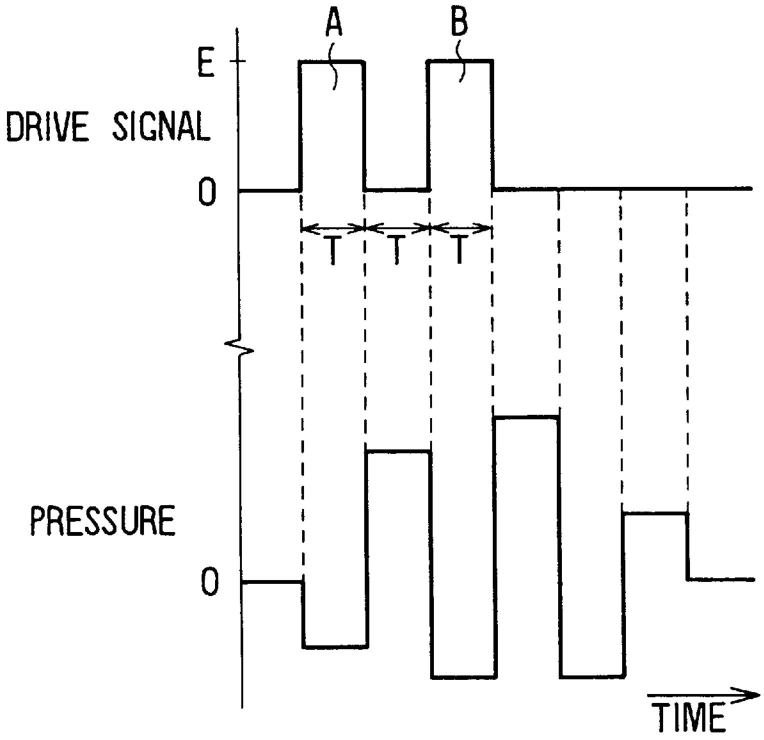
FIG. 15 PRIOR ART
FIG. 15 is a time chart showing an operation of the conventional arrangement.

Furthermore, although the positive power supply 187 is used in the second embodiment, a negative power supply may be employed instead so that the polarizing directions 609 and 611 shown in FIG. 14 are reversed. Also, as shown in FIG. 6, it is possible to make such an arrangement that the polarizing directions are reversed as discussed as one modification of the first embodiment.

According to the second embodiment and its modifications, if no print instruction is issued at a cycle time subsequent to a predetermined cycle time after a single droplet or plural droplets of ink are ejected in response to the ink emission pulse or pulses, the ink nonemission pulse for nonejection of ink droplets is applied to the ink jet apparatus, thereby making it possible to suppress residual pressure wave oscillation in the ink channel after ink droplet ejection. Even if the viscosity of ink decreases due to an increase in ambient temperature or any other cause, satisfactory quality of printing can be attained without an undesired accidental droplet of ink. Still more, since the nonemission pulse is applied if no print instruction is given at a cycle time subsequent to a predetermined cycle time after ejection of ink droplets, it is not necessary to insert a cancel pulse between plural emission pulses to be applied in succession, thereby making it possible to provide high speed printing operation.

Further, the nonemission pulse has a time width ranging from approximately 0.3 T to 0.7 T or 1.3 T to 1.8 T with respect to the emission pulse, and a period of 2.35 T to 2.65 T is provided between the fall time of the last emission pulse and the intermediate time corresponding to the midpoint between the rise time and the fall time of the nonemission pulse. In this arrangement, residual pressure wave oscillation in the ink channel after ejection of ink droplets can be suppressed effectively, ensuring good quality of high speed printing without an undesired accidental droplet.

Still further, the same or similar advantages of the first embodiment can be attained.

The present invention may be changed or altered further without departing from the spirit of the invention.

What is claimed is:

1. An ink droplet ejection drive method comprising the steps of:

applying an emission pulse for changing a volume of an ink channel to the ink channel filled with ink so that the ink channel is expanded in volume to generate a pressure wave in the ink channel; and decreasing an expanded volume of the ink channel to a normal state thereof to apply pressure to ink in the ink channel for ejecting a droplet of ink after a lapse of time approximately corresponding to one of one-way propagation time T of the pressure wave in the ink channel and an approximate odd-numbered multiple of T, wherein, after a plurality of ink droplets are ejected in response to a plurality of ink emission pulses for each one-dot print instruction, an ink nonemission pulse for nonejection of ink droplets, which has a time width ranging from approximately 0.3 T to 0.7 T or 1.3 T to 1.8 T is applied with a time period of approximately 2.35 T to 2.65 T between an end time of the last one of the plural emission pulses and an intermediate time corresponding to a midpoint between a start time and an end time of the nonemission pulse.

2. The ink droplet ejection drive method according to claim 1, wherein an amplitude of the emission pulse is equal to that of the nonemission pulse.

3. An ink droplet ejection drive apparatus comprising;

an ink channel for receiving ink therein;

an actuator for changing a volume of the ink channel;

a drive power supply for applying electric signals to the actuator; and a control device for controlling ink droplet ejection by applying an ink emission pulse from the drive power supply to the actuator to expand the ink channel in volume to generate a pressure wave in the ink channel and decreasing an expanded volume of the ink channel to a normal state thereof after a lapse of time approximately corresponding to one of one-way propagation time T of the pressure wave in the ink channel and an approximate odd-numbered multiple of T, wherein, the control device is constructed to apply to the actuator, following a sequence of the emission pulse to the actuator in response to a one-dot print instruction to eject plural ink droplets, an ink nonemission pulse which has a time width ranging approximately one of 0.3 T to 0.7 T and 1.3 T to 1.8 T with respect to the emission pulse, so that a period of approximately 2.35 T to 2.65 T is provided between an end time of the last one of the emission pulse and an intermediate time corresponding to a midpoint between a start time and an end time of the nonemission pulse.

4. The ink droplet ejection drive apparatus according to claim 3, wherein the drive power supply consists of a single circuit and an amplitude of the nonemission pulse is equal to that of the emission pulse.

5. The ink droplet ejection drive apparatus according to claim 3, wherein the actuator forms at least a wall part of the ink channel and includes a piezoelectric material.

6. An ink droplet ejection drive method comprising the steps of:

applying to an actuator at least one ink emission pulse in a predetermined cycle time of each one-dot print instruction for a droplet of ink so that a volume of an ink channel filled with ink is changed and a pressure wave is generated in the ink channel for ink droplet ejection; and applying to the actuator an ink nonemission pulse for nonejection of ink droplets in response to an absence of the one-dot print instruction within a next cycle time subsequent to the predetermined cycle time.

7. The ink droplet ejection drive method according to claim 6, wherein the emission pulse applied to the actuator has a time width equivalent to a time corresponding to one of a one-way propagation time T of the pressure wave in the ink channel and an approximate odd-numbered multiple of T for decreasing an expanded volume of the ink channel to a normal state thereof after the time width, the nonemission pulse has a time width in one of ranges of approximately 0.3 T to 0.7 T and 1.3 T to 1.8 T, and a period of 2.35 T to 2.65 T is provided between an end time of the last emission pulse and an intermediate time corresponding to a midpoint between a start time and an end time of the nonemission pulse.

8. An ink droplet ejection drive apparatus comprising;

an ink channel for receiving ink therein;

an actuator for changing a volume of the ink channel;

a drive power supply for applying electric signals to the actuator; and a control device for controlling ink droplet ejection by applying an ink emission pulse to the actuator to generate a pressure wave in the ink channel for applying pressure to ink therein, wherein the control device is constructed to apply to the actuator at least one emission pulse at a predetermined cycle time of each one-dot print instruction to eject a droplet of ink, and then apply an ink nonemission pulse for nonejection of ink droplet to the actuator in response to an absence of the print instruction within a next cycle time subsequent to the predetermined cycle time.

9. The ink droplet ejection drive apparatus according to claim 8, wherein the emission pulse is applied to the actuator for expanding the ink channel in volume to generate the pressure wave therein and decreasing an expanded volume of the ink channel to a normal state thereof after a lapse of time T approximately corresponding to an odd-numbered of multiple of a one-way propagation time T, the nonemission pulse has a time width in one of ranges approximately 0.3 T to 0.7 T and 1.3 T to 1.8 T, and a period of approximately 2.35 T to 2.65 T is provided between an end time of the last emission pulse and an intermediate time corresponding to a midpoint between a start time and an end time of the nonemission pulse.

10. The ink droplet ejection drive apparatus according to claim 8, wherein the power supply is a single circuit and the nonemission pulse and the emission pulse has the same polarity and amplitude therebetween.

11. An ink droplet ejection drive method for an ink droplet ejection apparatus having an actuator which deforms an ink channel, the method comprising the steps of:

applying to the actuator an ink emission pulse for ejection of ink from the ink channel in a predetermined cycle time of each one-dot print instruction; and in response to an absence of the one-dot print instruction within a next cycle time subsequent to the predetermined cycle time, applying to the actuator an ink nonemission pulse for nonejection of ink from the ink channel after a predetermined period from the last one of the ink emission pulse.

12. The ink droplet ejection drive method according to claim 11, wherein for each one-dot print instruction the emission pulse is applied to the actuator plural times followed by the nonemission pulse.

13. The ink droplet ejection drive method according to claim 11, wherein the cycle time of the print instruction is about 100 μsec, and the propagation time is about 8 μsec.

14. The ink droplet ejection drive method according to claim 11, wherein the nonemission pulse has a same voltage polarity and magnitude as that of the emission pulse and suppresses residual pressure wave oscillation in the ink channel.

15. The ink droplet ejection drive method according to claim 11, wherein the emission pulse has a time width corresponding to an odd-numbered multiple of one-way propagation time T of a pressure wave in the ink channel.

16. The ink droplet ejection drive method according to claim 15, wherein the nonemission pulse has a time width of around one of 0.5 T and 1.5 T, and the predetermined period is around 2.5 T when defined as a period starting from an end of the last emission pulse and ending at a midpoint between a start and end of the nonemission pulse.

17. The ink droplet ejection drive method according to claim 15, wherein the nonemission pulse has a time width in a range of one of 0.3 T to 0.7 T and 1.3 T to 1.8 T, and the predetermined period is in a range of 2.35 T to 2.65 T when defined as a period starting from an end of the last emission pulse and ending at a midpoint between a start and end of the nonemission pulse.

18. The ink droplet ejection drive method according to claim 15, wherein for each one-dot print instruction the emission pulse is applied to the actuator plural times followed by the nonemission pulse.

19. The ink droplet ejection drive method according to claim 18, wherein the nonemission pulse has a time width of around one of 0.5 T and 1.5 T, and the predetermined period is around 2.5 T when defined as a period starting from an end of the last emission pulse and ending at a midpoint between a start and an end of the nonemission pulse.

* * * * *